(12) United States Patent
Verstrate et al.

(10) Patent No.: US 10,550,993 B2
(45) Date of Patent: Feb. 4, 2020

(54) ROTARY SUPPORT SYSTEMS, ASSOCIATED CONTROL DEVICES, AND METHODS OF OPERATING THE SAME

(71) Applicant: MastWerks, LLC, Hillsboro, OR (US)

(72) Inventors: Paul Verstrate, Hillsboro, OR (US); David Haycock, Gig Harbor, WA (US); Christopher D. Drummond, Portland, OR (US)

(73) Assignee: MastWerks, LLC, Hillsboro, OR (US)

( * ) Notice: Subject to any disclaimer, the term of this patent is extended or adjusted under 35 U.S.C. 154(b) by 550 days.

(21) Appl. No.: 15/337,269

(22) Filed: Oct. 28, 2016

(65) Prior Publication Data

US 2017/0122490 A1 May 4, 2017

Related U.S. Application Data

(60) Provisional application No. 62/247,999, filed on Oct. 29, 2015.

(51) Int. Cl.
| | |
|---|---|
| *F16M 11/08* | (2006.01) |
| *F16M 11/18* | (2006.01) |
| *E04H 12/18* | (2006.01) |
| *F16M 11/34* | (2006.01) |

(Continued)

(52) U.S. Cl.
CPC .............. *F16M 11/08* (2013.01); *E04H 12/18* (2013.01); *F16M 11/18* (2013.01); *F16M 11/34* (2013.01); *H01Q 1/1228* (2013.01); *H01Q 1/1242* (2013.01); *H01Q 3/04* (2013.01)

(58) Field of Classification Search
CPC ...... F16M 11/08; E04H 12/18; H01Q 1/1228; H01Q 3/04; G05B 19/406
See application file for complete search history.

(56) References Cited

U.S. PATENT DOCUMENTS

| | | |
|---|---|---|
| 3,952,984 A | 4/1976 | Dimitry |
| 5,399,949 A | 3/1995 | Hidaka |
| 6,877,915 B1 | 4/2005 | Wei |

(Continued)

OTHER PUBLICATIONS telescopes.com, "Telescope Mounts: More Than Just a Tripod," www.telescopes.com/telescopes/telescopemountsarticle.cfm, p. 1, available at least as early as Dec. 3, 2014.

(Continued)

*Primary Examiner* — Eduardo Colon Santana
*Assistant Examiner* — Said Bouziane
(74) *Attorney, Agent, or Firm* — DASCENZO Intellectual Property Law, P.C.

(57) ABSTRACT

Rotary support systems, associated control devices, and methods of operating the same. Rotary support systems include a mast configured to support an elevated device and a base that includes a rotary mechanism that rotatably couples the mast to the base. The rotary mechanism is configured to selectively rotate the mast. The mast has a cross-sectional profile that is non-circular. Rotary support systems additionally may include a controller configured to interface with an electric motor to rotate the mast with respect to the base. Controller implemented methods for operating a rotary support system include receiving an input command and, responsive to the receiving the input command, sending an output command to an electric motor to rotate the mast relative to the base.

17 Claims, 4 Drawing Sheets

(51) Int. Cl.
*H01Q 1/12* (2006.01)
*H01Q 3/04* (2006.01)

(56) References Cited

U.S. PATENT DOCUMENTS

| | | |
|---|---|---|
| 8,418,973 B2 | 4/2013 | Liu et al. |
| 8,794,853 B2 | 8/2014 | Piccoli et al. |
| 2005/0128347 A1 | 6/2005 | Ryu et al. |
| 2009/0090403 A1 | 4/2009 | McCalla |
| 2011/0006170 A1 | 1/2011 | Liu et al. |
| 2013/0090772 A1* | 4/2013 | Pfrenger ............ G05D 3/12 700/284 |
| 2013/0245833 A1* | 9/2013 | McKibben ........ E05B 47/0001 700/275 |
| 2015/0349417 A1* | 12/2015 | Richards ............ H01Q 3/08 342/352 |

OTHER PUBLICATIONS

SkyRadar, "SkyRadar Modular Radar Training System: CW, Pulse, Doppler, Security, Target Positioning System, Scopes" product information brochure, 2014.

SkyRadar, Rotary Tripod, www.skyradar.com/radar-training-system/rotary-tripod, available at least as early as Nov. 18, 2014.

Portable Rotation Portable Antenna Rotor and Support Systems, Ultra-Portable Rotor System, www.portablerotation.com/product/12pr1a-ultra-portable-rotor-system/, available at least as early as Dec. 3, 2014.

\* cited by examiner

ROTARY SUPPORT SYSTEMS, ASSOCIATED CONTROL DEVICES, AND METHODS OF OPERATING THE SAME

RELATED APPLICATION

This application claims priority to U.S. Provisional Patent Application Ser. No. 62/247,999, which was filed on Oct. 29, 2015, the complete disclosure of which is hereby incorporated by reference for all purposes.

FIELD

The present disclosure is related to rotary support systems, associated control devices, and methods of operating the same.

BACKGROUND

Devices configured to be positioned at vertically elevated locations, such as portable radio antenna systems, may operate in a variety of locations and environmental conditions, and the performance of such devices may depend on such factors as the rotational orientation of the device and/or the vertical height of the device above ground level. For example, portable radio antenna systems may be configured to perform optimally when elevated above ground level by at least a particular height and/or when assuming a particular orientation with respect to a compass direction. To meet these conditions, the device may be supported by a support structure that maintains the device at a customizable vertical position and rotational orientation. However, the rotational orientation of the device may be unintentionally varied by environmental factors such as wind, and it may be difficult or cumbersome to precisely adjust the rotational orientation of the device.

SUMMARY

The present disclosure relates to rotary support systems, associated control devices, and methods of operating the same, such as may be used to support an elevated device at a vertically elevated position above a ground surface. Rotary support systems according to the present disclosure include a mast configured to support an elevated device, and a base that includes a rotary mechanism that rotatably couples the mast to the base. The rotary mechanism is configured to selectively rotate the mast. In some embodiments, the mast has a cross-sectional profile, as measured in a plane perpendicular to a longitudinal axis of the mast, that is non-circular. Rotary support systems additionally may include a controller configured to interface with an electric motor to rotate the mast with respect to the base. Controller implemented methods for operating a rotary support system include receiving an input command that pertains to a rotational orientation of a mast relative to a base of the rotary support system and, responsive to the receiving the input command, sending an output command to an electric motor to rotate the mast relative to the base.

DETAILED DESCRIPTION

FIGS. 1-10 provide examples of rotary support systems 100 and associated apparatuses and methods. Elements that are likely to be included in a given embodiment are illustrated in solid lines in each of FIGS. 1-10, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labeled with like numbers in each of FIGS. 1-10, and these elements may not be discussed in detail herein with reference to each of FIGS. 1-10. Similarly, all elements may not be labeled or shown in each of the figures, but reference numerals associated therewith may be used for consistency. Elements, components, and/or features that are discussed with reference to one or more of the figures may be included in and/or used with any of the figures without departing from the scope of the present disclosure.

Figure 1:
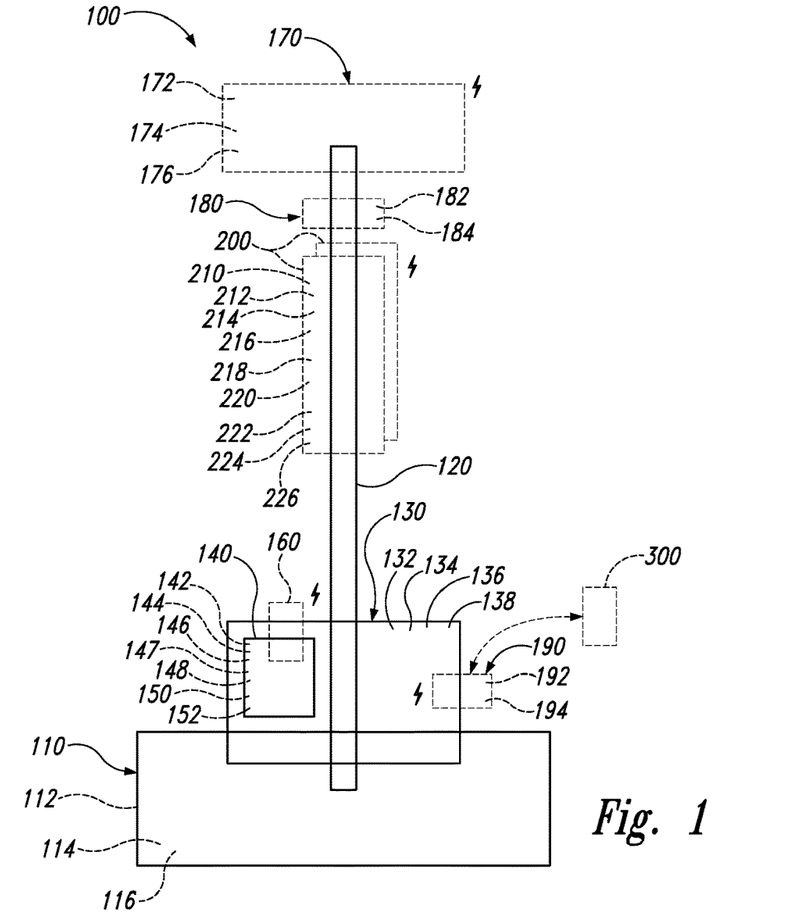
FIG. 1 is a schematic elevation view representation of a rotary support system according to the present disclosure.

Rotary support systems according to the present disclosure are schematically illustrated in FIG. 1 and generally indicated at 100. As illustrated in FIG. 1, rotary support systems 100 according to the present disclosure may include a base 110 that includes a rotary mechanism 130 and a mast 120 coupled to the base via rotary mechanism 130. Rotary mechanism 130 may include a gear assembly 140 that may serve to rotate mast 120 about a longitudinal axis of the mast. Gear assembly 140 may be actuated manually and/or automatically. Rotary support system 100 further may include an elevated device 170 coupled to a top end of mast 120, such that the height and rotational orientation of elevated device 170 may be varied by selectively varying the height and rotational orientation of mast 120. As examples, elevated device 170 may include and/or be an antenna assembly, a visual recording assembly, an audio recording assembly, a speaker assembly, and/or a lighting assembly. Rotary support system 100 further may include a mast guying system 180 that is configured to support mast 120 in an upright position.

As used herein, the terms "upper," "above," "top," "lower," "below," "bottom," and similar terms as used to describe spatial relationships between components of rotary support system 100, and/or between a component of rotary support system 100 and a ground surface or other object, are considered from the perspective of rotary support system 100 positioned in an upright orientation on a level ground surface. Accordingly, an upper surface, or upper side, refers to a surface or side of a component that generally faces away from the ground surface, and a lower surface, or lower side, refers to a surface or side that generally faces toward the ground surface.

Rotary support system 100 may additionally include one or more sensor modules 200 that may be configured to make measurements pertaining to their position, orientation, and/or environmental conditions, and that may transmit sensor information to a controller 190 and/or to a remote electronic device 300. Remote electronic device 300 may display and/or otherwise communicate the sensor information, and/or may prompt a user to issue a command to controller 190. Responsive to the information transmitted by sensor module 200, either directly or by proxy of a command from remote electronic device 300 and/or a user thereof, controller 190 may send a signal to an electric motor 160 coupled to gear assembly 140 to rotate mast 120.

Mast 120 may be coupled to base 110 by rotary mechanism 130. The mast may be configured to support elevated device 170 at a variable height above ground level. For example, the mast may be configured to support elevated device 170 at a height of at least 3 feet, at least 6 feet, at least 12 feet, at least 20 feet, at most 30 feet, at most 25 feet, at most 15 feet, at most 10 feet, and/or at most 5 feet above ground level. Additionally or alternatively, this height may be adjustable. For example, mast 120 may be a telescoping mast 120, and/or may consist of a plurality of segments that may be selectively coupled in any number to reach a desired total length. Mast 120 may be constructed of any appropriate material. As examples, mast 120 may be constructed of a metal such as aluminum, steel, and/or titanium, a plastic, or a reinforced plastic, such as a fiberglass material or a carbon (or other) fiber reinforced plastic, such as to ensure that the mast is lightweight, durable, and/or weather-resistant.

Mast 120 may be shaped such that a cross-sectional profile of the mast, as measured in a plane perpendicular to the longitudinal axis of the mast, is at least partially configured to maintain a rotational orientation of the mast. In particular, the cross-sectional profile of mast 120 may be configured such that engagement of the mast with a correspondingly shaped mast aperture 138 in rotary mechanism 130 restricts and/or prevents the mast from rotating within the mast aperture when the mast is coupled to the rotary mechanism. Stated differently, mast 120 and mast aperture 138 may be shaped such that the mast is geometrically constrained from rotating with respect to the mast aperture when the mast is coupled to rotary mechanism 130.

Figure 2:
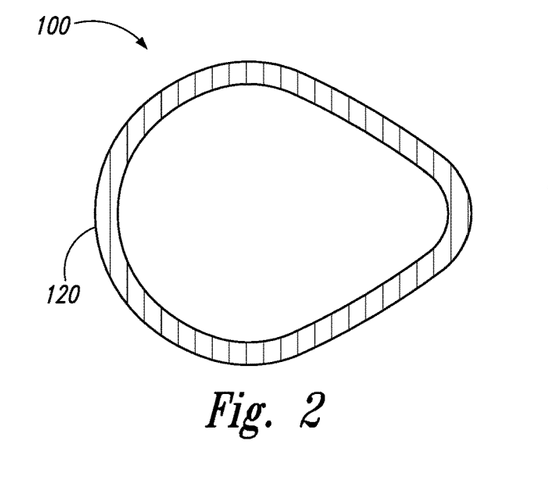
FIG. 2 is a top cross sectional view of a mast that may be utilized with a rotary support system.
Figure 4:
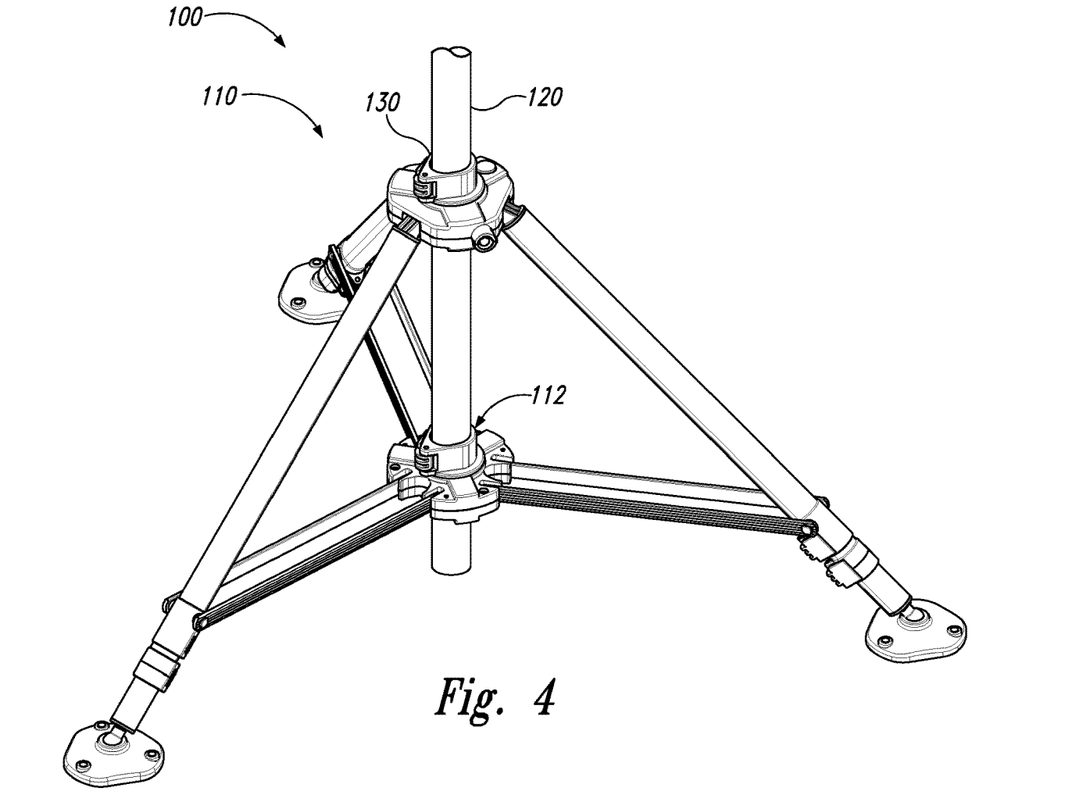
FIG. 4 is a front perspective view of a rotary support system base and associated mast.
Figure 5:
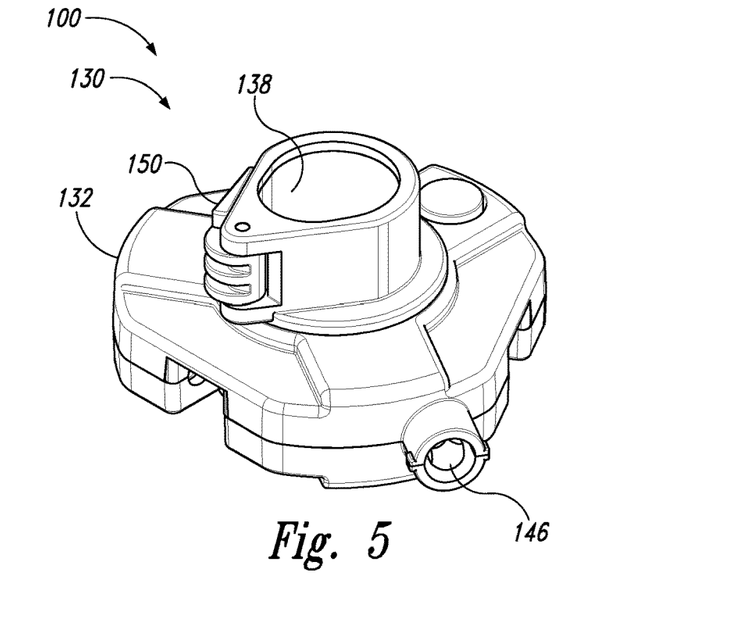
FIG. 5 is a front perspective view of a rotary mechanism of the rotary support system base of FIG. 4.
Figure 6:
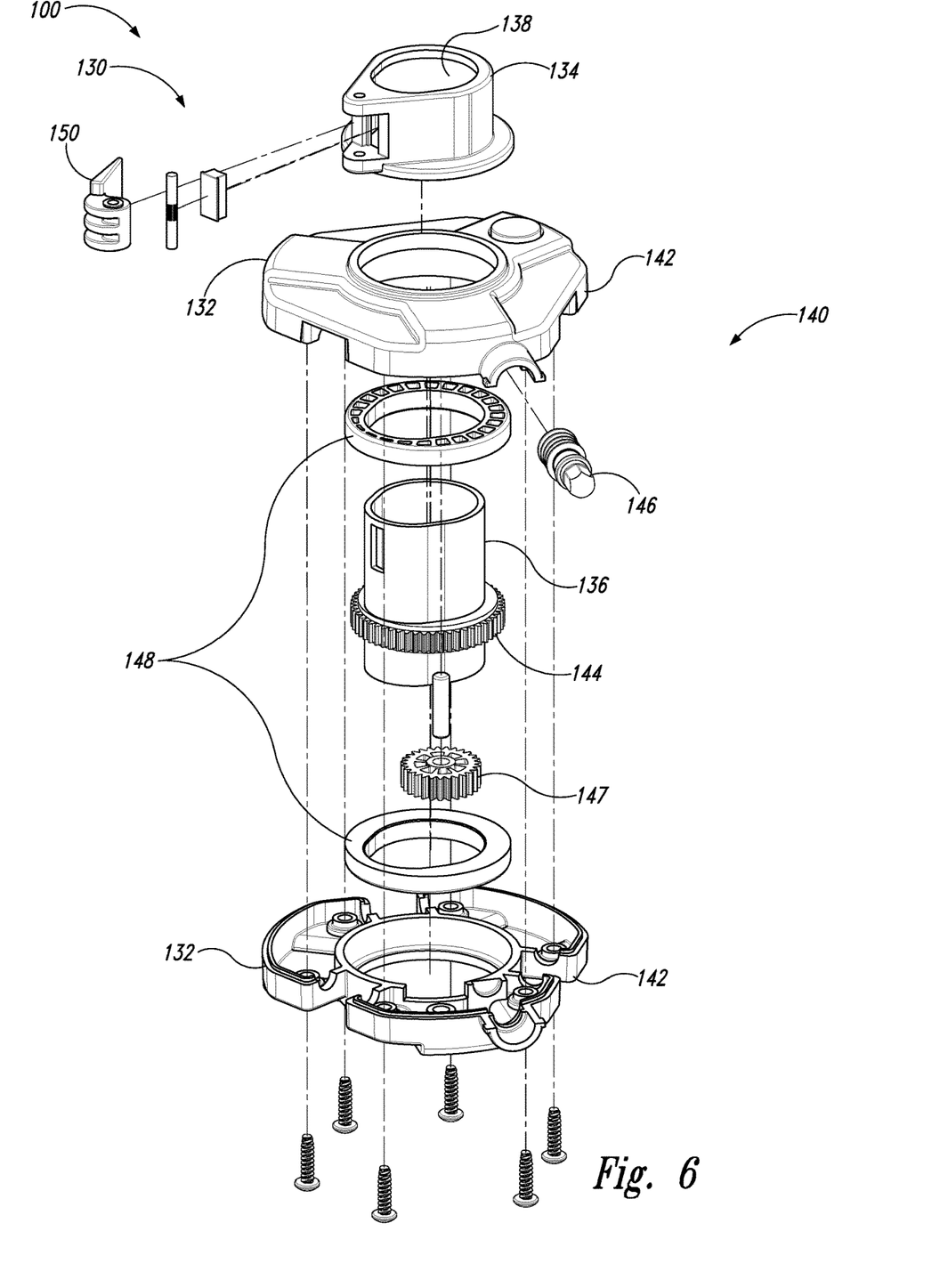
FIG. 6 is an exploded view of the rotary mechanism of FIG. 5.

As an example, and as illustrated in FIG. 2, the cross-sectional profile of mast 120 may be ovoid, or egg-shaped, such that the cross-sectional profile has one axis of symmetry. In such an embodiment, engagement of the mast with a correspondingly shaped mast aperture 138 in rotary mechanism 130 may reduce the likelihood of an inadvertent rotation of the mast about its longitudinal axis with respect to the rotary mechanism when subjected to an unintended torque, such as a wind force. An example of rotary mechanism 130 with an ovoid mast aperture 138 is illustrated in FIGS. 4-6. It is not necessary that mast 120 has a cross-sectional profile in the shape of an oval, however, and it is within the scope of the present disclosure that the cross-sectional profile may assume any non-circular shape, examples of which may include an ellipse, a triangle, and a quadrilateral. Additionally or alternatively, it is within the scope of the present disclosure that the cross-sectional profile may have any appropriate number of axes of symmetry such that an engagement between mast 120 and mast aperture 138 restricts the mast from rotating with respect to the mast aperture. As examples, the cross-sectional profile may have at most 10 axes of symmetry, at most 5 axes of symmetry, at most 2 axes of symmetry, 1 axis of symmetry, or no axes of symmetry. Moreover, a cross-sectional profile of mast 120 may be selected for aesthetic reasons, while still providing the functionality of mast 120 as discussed herein.

As illustrated in FIG. 4, base 110 of rotary support system 100 may include rotary mechanism 130 located at a top end of the base. Base 110 may have a plurality of legs with independently adjustable lengths to further adjust the vertical height of elevated device 170 and/or to maintain mast 120 in a substantially vertical orientation when the base rests on an uneven ground surface. The plurality of legs may include any appropriate number of legs. For example, and as illustrated in FIG. 4, base 110 may include three legs. In such an embodiment, base 110 also may be referred to as a tripod. However, this is not required, and it is within the scope of the present disclosure that base 110 be a structure other than a tripod, that the base may have more than three legs, may have fewer than three legs, or may not have legs.

Turning now to FIGS. 5 and 6, rotary mechanism 130 may be configured to receive mast 120 in mast aperture 138, and to secure and/or apply torque to the mast through engagement with a mast sleeve 136. As perhaps best seen in FIG. 6, rotary mechanism 130 may include a rotary mechanism housing 132 that encloses a gear assembly 140 and a bearing assembly 148. Gear assembly 140 may be housed in a gear assembly housing 142. Rotary mechanism housing 132 may include and/or be gear assembly housing 142, or rotary mechanism housing 132 and gear assembly housing 142 may refer to distinct components. Gear assembly 140 may be utilized to transfer an externally applied torque to mast 120, such as to rotate the mast about its longitudinal axis. For example, the gear assembly may include a spur gear 144 fixed on mast sleeve 136 that engages a worm wheel 147, which in turn engages a worm screw 146, wherein the worm screw is configured to be selectively actuated. Worm screw 146 may be actuated manually, such as with a handle 152 that may be selectively coupled to the gear assembly. Alternatively, worm screw 146 may be actuated automatically, such as with an electric motor 160 that may be included in and/or selectively coupled to the gear assembly. It is within the scope of the present disclosure that gear assembly 140 additionally or alternatively may include any other configuration of gears and/or actuators suitable to transmit a torque to mast 120. For example, gear assembly 140 additionally or alternatively may include a bevel gear, a rack and pinion gear, and/or a helical gear.

Electric motor 160, when present, may be substantially enclosed by rotary mechanism housing 132, or may extend at least partially, and optionally fully, on the exterior of the rotary mechanism housing. Additionally or alternatively, electric motor 160 may be selectively attached to and detached from the rotary mechanism. For example, gear assembly 140 may include an input connection to which the handle and/or the electric motor may be selectively and/or alternatively coupled. As a more specific example, the input connection may be configured to operatively couple the handle and/or the electric motor to worm screw 146.

Bearing assembly 148 may be configured to reduce an effective frictional force between mast 120 and base 110 as mast 120 rotates within rotary mechanism 130. As an example, bearing assembly 148 may be configured to facilitate a relative rotation of mast sleeve 136 and a remainder of rotary mechanism 130. As illustrated in FIG. 6, bearing assembly 148 may be a roller bearing assembly. However, this is not required, and it is within the scope of the present disclosure that bearing assembly 148 may take the form of any appropriate bearing assembly, such as a bushing assembly. Bearing assembly 148 and/or mast sleeve 136 may have a central bore with a shape corresponding to the cross-sectional profile of mast 120, such that an outer surface of the mast may statically engage an inner surface of the bearing assembly and/or the mast sleeve when the mast is coupled to the rotary mechanism.

Mast 120 may be selectively coupled to and decoupled from the rotary mechanism using a clamp 150, which may selectively tighten a collar 134 of the rotary mechanism housing onto the mast and release the collar from the mast. Additionally or alternatively, base 110 may include a lower mast clamp 112 positioned generally below rotary mechanism 130 and configured to selectively couple to and decouple from mast 120. As schematically illustrated in FIG. 1, lower mast clamp 112 may include a lower mast clamp bearing 114 configured to facilitate a rotation of mast 120 with respect to base 110. Additionally or alternatively, lower mast clamp 112 may include a lower mast sleeve 116 that has a central bore with a shape corresponding to the cross-sectional profile of mast 120, such that an outer surface of the mast may statically engage an inner surface of the lower mast sleeve when the mast is coupled to the lower mast clamp. Additionally or alternatively, lower mast clamp 112 may include rotary mechanism 130. In such an embodiment, base 110 may be said to include rotary mechanism 130 in the form of and/or as a component of lower mast clamp 112.

As illustrated in FIG. 1, in an embodiment in which elevated device 170 includes and/or is an antenna assembly 170, elevated device 170 may include an antenna 172 that is configured to transmit and/or receive an electromagnetic signal. Antenna 172 may be a dipole antenna, such as may be configured to operate at frequencies associated with amateur radio. For example, antenna 172 may be configured to send and/or receive radio signals with a frequency of less than 2 MHz, 1.5-4 MHz, 2-7 MHz, 5-10 MHz, 8-14 MHz, 12-18 MHz, 15-25 MHz, 20-30 MHz, and/or more than 25 MHz. However, it is within the scope of the present disclosure that antenna 172 be an antenna for any purpose, examples of which may include a television antenna, a cellular phone antenna, and a commercial radio antenna. Elevated device 170 further may include an elevated device transceiver 174 that is configured to relay electrical signals between antenna 172 and at least one of electric motor 160, controller 190, at least one sensor module 200, and remote electronic device 300. Elevated device transceiver 174 may be configured to transmit and/or receive signals wirelessly, and/or may be configured to transmit and/or receive signals via a wired connection. Elevated device 170 further may include an elevated device mount 176, which may be employed to selectively couple one or more components of the elevated device to mast 120. Elevated device mount 176 may be configured to permit elevated device 170 to be coupled to mast 120 in a selected orientation of a plurality of orientations. For example, when elevated device 170 is antenna 172 in the form of a dipole antenna, elevated device mount 176 may permit the antenna to be selectively mounted to mast 120 in an orientation that is substantially parallel to a ground surface, in an orientation that is substantially perpendicular to a ground surface, and/or in an orientation that is inclined with respect to a ground surface.

Rotary support system 100 further may include mast guying system 180 that is configured to support mast 120 in a vertically upright position. For example, in some embodiments, a configuration of rotary support system 100 may be such that the rotary support system is unstable when supported only by base 110, such as if elevated device 170 is particularly heavy and/or high off the ground, and/or if the base has a narrow footprint and/or is positioned on an uneven ground surface. In such an embodiment, mast guying system 180 may be employed to add stability to the rotary support system. Mast guying system 180 may include a plurality of guy lines 182, such as two guy lines, three guy lines, four guy lines, five guy lines, or more than five guy lines, that each are coupled to the mast and to a corresponding anchor point on the ground. The anchor points may be radially distributed around the base, and may be substantially evenly spaced apart. The guy lines may be statically coupled to mast 120 such that the mast is restricted from rotating when the mast guying system is utilized, or the guy lines may be coupled to the mast in such a manner that the mast is free to rotate about its longitudinal axis. For example, the guy lines may be coupled to a guy collar 184 that in turn is rotatably coupled to the mast.

With continued reference to FIG. 1, rotary support system 100 may include one or more sensor modules 200 that may be coupled to one or more of base 110, mast 120, and elevated device 170. As used herein, sensor module 200 may refer to a sensor and/or to a housing or assembly that includes at least one sensor. Examples of sensors that may be included in sensor module 200 include a compass chip 212, an accelerometer 214, an anemometer 216, a barometer 218, an altimeter 220, a thermometer 222, a global positioning system (GPS) receiver 224, and a bubble level 226. Sensor module 200 additionally may include a wireless transceiver 210 that may be utilized to exchange information with one or more of elevated device 170, controller 190, and remote electronic device 300. Additionally or alternatively, sensor module 200 may include an audio and/or visual indication of a measurement performed by the sensor. For example, if the sensor module includes and/or is a non-electronic sensor, such as bubble level 226, the sensor module may not include wireless transceiver 210, and instead may provide the user with a visual indication of the condition of the sensor.

One or more sensor modules 200 may collect information regarding the physical location, orientation, and/or environmental conditions associated with rotary support system 100. For example, compass chip 212, when present, may provide an electronic indication of the orientation of at least a portion of the rotary support system, such as mast 120 and/or elevated device 170, with respect to a compass direction. As another example, altimeter 220, when present, may provide an electronic indication of the altitude of the rotary support system above sea level. As yet another example, GPS receiver 224, when present, may provide an electronic indication of geographical coordinates (e.g. longitude and latitude) of the rotary support system. Such positional information may be utilized by the user to optimize the performance of elevated device 170, for example, by positioning the elevated device at a desired elevation, geographical location, and/or rotational orientation. Additionally or alternatively, anemometer 216, when present, may provide an electronic indication of a wind speed and/or direction at the location of the anemometer, and barometer 218, when present, may provide an electronic indication of the barometric pressure at the location of the barometer. Such environmental information may be utilized by the user to monitor and/or predict local weather conditions, such as to protect rotary support system 100 from environmental damage. Additionally or alternatively, accelerometer 214, when present, may provide an electronic indication of an orientation of the rotary support system and/or changes in the orientation of the rotary support system. For example, the accelerometer may provide an electronic signal indicating an undesired tipping or tilting of the rotary support system.

Rotary support system 100 further may include controller 190, which may be configured to receive input commands from one or more of elevated device 170, one or more sensor modules 200, remote electronic device 300, and directly from the user, and transmit an electric signal to electric motor 160 that is configured to actuate gear assembly 140. Controller 190 may include a controller transceiver 192 that is configured to send and/or receive signals from one or more components of rotary support system 100 wirelessly, and/or may be configured to send and/or receive signals from one or more components of the rotary support system via a wired connection. For example, and as is discussed in more detail with reference to FIGS. 7-10, controller 190 may receive a signal from anemometer 216 indicating a wind speed in excess of a predetermined threshold speed, and may subsequently transmit a command to electric motor 160 to rotate mast 120 so as to reduce and/or minimize the force of the wind on rotary support system 100. Additionally or alternatively, controller 190 may include a manual input 194 that is configured to permit a user to manually input rotation commands.

Figure 3:
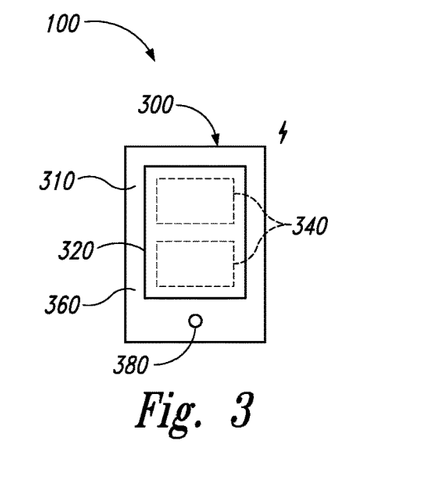
FIG. 3 is a schematic representation of a remote electronic device.

With reference to FIG. 3, rotary support system 100 may include remote electronic device 300 that is configured to communicate with one or more of electric motor 160, elevated device 170, controller 190, and one or more sensor modules 200. Remote electronic device 300 may be configured to send and/or receive signals from one or more components of rotary support system 100 wirelessly, and/or may be configured to send and/or receive signals from one or more components of the rotary support system via a wired connection.

The remote electronic device may include a memory device 310 configured to direct the remote electronic device to perform one or more methods disclosed herein, a display 320 that may be used to display visual indicia 340, a transceiver 360 configured to transmit and receive wired or wireless signals, and/or a user input mechanism 380 configured to receive inputs from the user. In some embodiments, display 320 and user input mechanism 380 may refer to the same component. For example, display 320 may be a touch screen that is configured to receive inputs from the user. Examples of remote electronic device 300 include a smart phone, a tablet computer, a laptop computer, and a wired and/or wireless remote electronic device specifically designed for use with rotary support system 100.

Figure 7:
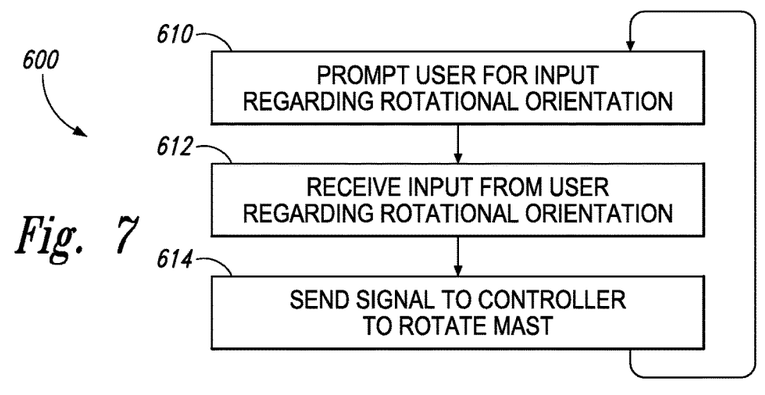
FIG. 7 is a schematic flow chart representing remote electronic device implemented methods for operating a rotary support system.
Figure 8:
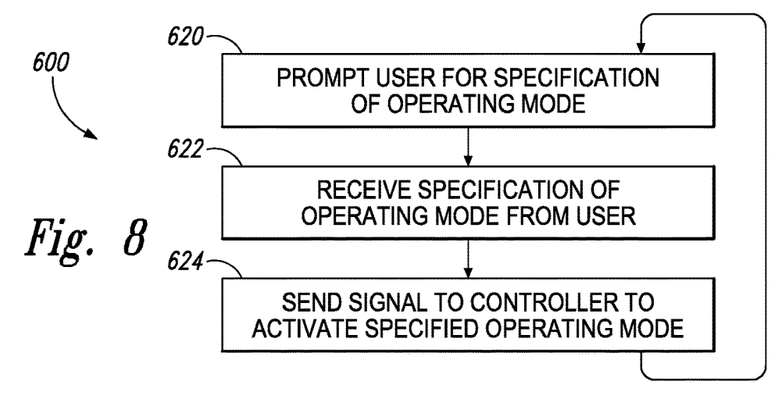
FIG. 8 is a schematic flow chart representing remote electronic device implemented methods for operating a rotary support system.
Figure 9:
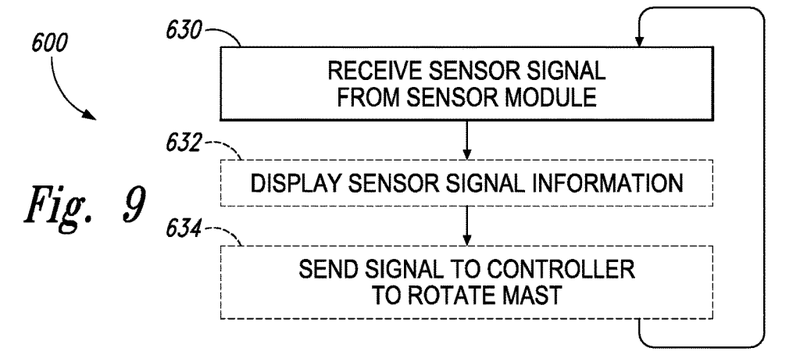
FIG. 9 is a schematic flow chart representing remote electronic device implemented methods for operating a rotary support system.

In FIGS. 7-9, examples of remote electronic device implemented methods are illustrated and generally indicated at 600. As illustrated in FIG. 7, remote electronic device implemented methods 600 may include methods for enabling a user to utilize a remote electronic device (such as remote electronic device 300) to wirelessly send a command to rotate a mast (such as mast 120) of a rotary support system (such as rotary support system 100). For example, such a method may include prompting 610 the user for an input regarding a desired rotational orientation of the mast, receiving 612 the input from the user (such as via a user input mechanism such as user input mechanism 380), and/or wirelessly sending 614 a command signal to a controller (such as controller 190) that may direct an electric motor (such as electric motor 160) to rotate the mast.

Additionally or alternatively, as illustrated in FIG. 8, methods 600 may include methods for allowing the user to select a mode of operation for the rotary support system. For example, the rotary support system may be configured to perform an automated mode of operation in which the controller instructs the electric motor to rotate the mast responsive to a signal sent from a sensor module (such as sensor module 200) without user intervention. Such methods 600 may include prompting 620 the user to specify an operating mode, receiving 622 the user's specification of operating mode (such as via a user input mechanism), and/or sending 624 a command signal to the controller to enable the specified operation mode.

As illustrated in FIG. 9, methods 600 further may include methods for receiving information from a sensor module, as well as optionally displaying the information to the user and/or sending a command to the controller responsive to the information. Such methods may include receiving 630 a sensor signal from a sensor module, and optionally may include displaying 632 an indication of the sensor signal for the user and/or sending 634 a signal to the controller of the rotary support system to rotate the mast responsive to the sensor signal. For example, if the sensor module includes and/or is an anemometer (such as anemometer 216) that sends a sensor signal indicating a wind speed in excess of a predetermined threshold wind speed, the remote electronic device may send a command to the controller to rotate the mast to a rotational configuration that reduces and/or minimizes the force of wind on the rotary support system. The remote electronic device may be configured to receive a sensor signal from a sensor module at any time, or may be configured to poll one or more sensor modules at regular intervals in time. The displaying 632 may include displaying graphical or textual indicia (such as indicia 340) on a display (such as display 320), and/or may include an audible alert and/or message. The remote electronic device may be configured to perform the wirelessly sending 634 only subsequent to the receiving 622 the user's specification of an automated mode of operation. However, this is not required, and it is within the scope of the present disclosure that the various steps of methods 600 may be performed in any appropriate sequence.

Figure 10:
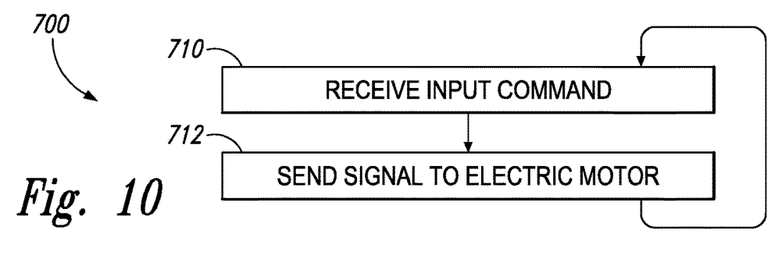
FIG. 10 is a schematic flow chart representing examples of controller implemented methods for operating a rotary support system.

Turning now to FIG. 10, examples of controller implemented methods are generally indicated at 700. Methods 700 may include receiving 710 an input command and sending 712 a signal to the electric motor to rotate the mast. The input command may be a command to rotate the mast by a specified amount. The input command may be delivered to the controller by the user, either directly, such as via a manual input (such as manual input 194), or via the remote electronic device. Additionally or alternatively, the input command may be delivered to the controller by a sensor module. For example, if the sensor module includes and/or is an anemometer (such as anemometer 216) that sends a sensor signal indicating a wind speed in excess of a predetermined threshold wind speed, the controller may send a command to rotate the mast so as to reduce and/or minimize the force of wind on the rotary support system. The signal sent to the electric motor may be an electrical signal specifying the power that may be supplied to the electric motor to achieve the desired degree of rotation, or the controller may directly power the electric motor to achieve the desired rotational configuration. The controller may be configured to perform the sending 712 responsive to receiving 710 an input command from a sensor module only following the user's specification of an automated mode of operation. Similarly, the controller may be configured to perform the sending 712 responsive to receiving 710 an input command from the user, optionally via the remote electronic device, only subsequent to the user disabling an automated mode of operation.

Examples of rotary support systems, associated control devices, and methods of operating the same according to the present disclosure are presented in the following enumerated paragraphs.

A1. A rotary support system for an elevated device, the system comprising:
   a base that includes a rotary mechanism; and
   a mast extending vertically from the base;
   wherein the mast is configured to support the elevated device at a vertically elevated position;
   wherein the mast is operatively coupled to the rotary mechanism; and
   wherein the rotary mechanism is configured to selectively rotate the mast about a longitudinal axis of the mast responsive to a control input.

A2. The rotary support system of paragraph A1, wherein the mast is configured to support the elevated device at a height of at least one of at least 3 feet, at least 6 feet, at least 9 feet, at least 12 feet, at least 20 feet, at most 30 feet, at most 25 feet, at most 15 feet, at most 10 feet, and at most 5 feet vertically from a surface on which the base rests.

A3. The rotary support system of any of paragraphs A1-A2, wherein the mast has a cross-sectional profile as measured in a plane perpendicular to the longitudinal axis of the mast that is non-circular.

A4. The rotary support system of paragraph A3, wherein the cross-sectional profile of the mast has at least one of at most 10 axes of symmetry, at most 5 axes of symmetry, at most 2 axes of symmetry, at most 1 axis of symmetry, and no axes of symmetry.

A5. The rotary support system of paragraph A4, wherein the cross-sectional profile of the mast is an oval with 1 axis of symmetry.

A6. The rotary support system of any of paragraphs A1-A5, wherein the rotary mechanism includes a gear assembly for rotating the mast relative to the base.

A7. The rotary support system of paragraph A6, wherein the rotary mechanism includes a rotary mechanism housing, and further wherein the gear assembly is at least partially housed within the rotary mechanism housing.

A8. The rotary support system of any of paragraphs A6-A7, wherein the gear assembly includes at least one of a gear assembly housing, a spur gear, a worm screw, a worm wheel, a bearing assembly, and a clamp.

A9. The rotary support system of paragraph A8, wherein the bearing assembly is a roller bearing assembly.

A10. The rotary support system of paragraph A9, wherein the roller bearing assembly has an inner bore with a shape corresponding to a/the cross-sectional profile of the mast.

A11. The rotary support system of paragraph A8, wherein the bearing assembly is a bushing assembly.

A12. The rotary support system of paragraph A11, wherein the bushing assembly includes an inner sleeve and an outer sleeve, and further wherein the inner sleeve has a bore with a shape corresponding to a/the cross-sectional profile of the mast.

A13. The rotary support system of any of paragraphs A8-A12, wherein the clamp is configured to selectively couple and decouple the mast and the base.

A14. The rotary support system of any of paragraphs A6-A13, wherein the gear assembly includes a handle that is configured to be manually actuated by a user to rotate the mast relative to the base.

A15. The rotary support system of any of paragraphs A6-A14, wherein the rotary mechanism further includes an electric motor configured to drive the gear assembly to rotate the mast relative to the base.

A16. The rotary support system of paragraph A15, wherein the electric motor is at least partially housed within at least one of a/the rotary mechanism housing and a/the gear assembly housing.

A17. The rotary support system of paragraph A15, wherein the electric motor is external to at least one of a/the gear assembly housing and a/the rotary mechanism housing.

A18. The rotary support system of any of paragraphs A15-A17, wherein the electric motor is configured to be selectively coupled to and uncoupled from the gear assembly.

A19. The rotary support system of any of paragraphs A1-A18, wherein the rotary support system further includes at least one sensor module operatively coupled to at least one of the base, the rotary mechanism, the mast, and the elevated device.

A20. The rotary support system of paragraph A19, wherein the at least one sensor module includes at least one of a wireless transceiver, an accelerometer, an anemometer, a barometer, an altimeter, a thermometer, an electronic compass, a global positioning system (GPS) receiver, and a bubble level.

A21. The rotary support system of any of paragraphs A19-A20, wherein at least one sensor module is attached to the mast and is spaced apart from the base.

A22. The rotary support system of any of paragraphs A1-A21, wherein the rotary support system further includes a remote electronic device.

A23. The rotary support system of paragraph A22, when dependent on paragraph A15, wherein the rotary support system further includes a controller that is configured to receive a sensor input from at least one of the remote electronic device and at least one sensor module and to interface with the electric motor.

A24. The rotary support system of paragraph A23, wherein the controller is coupled to at least one of the base, the rotary mechanism, the mast, and the elevated device.

A25. The rotary support system of any of paragraphs A23-A24, wherein at least one of the remote electronic device and the controller is configured to interface wirelessly with at least one sensor module.

A26. The rotary support system of any of paragraphs A19-A25, wherein a/the remote electronic device is configured to communicate with at least one of:
(i) at least one sensor module;
(ii) a/the controller;
(iii) an/the electric motor; and
(iv) the elevated device.

A27. The rotary support system of any of paragraphs A1-A26, wherein the elevated device is coupled to a top end of the mast.

A28. The rotary support system of any of paragraphs A1-A27, wherein the elevated device includes a dipole antenna.

A29. The rotary support system of paragraph A28, wherein the dipole antenna is configured to be at least one of a receiving antenna and a transmitting antenna.

A30. The rotary support system of any of paragraphs A1-A29, wherein the rotary support system further includes a mast guying system operatively coupled to the mast and configured to provide stability to at least one of the mast and the elevated device.

B1. A remote electronic device implemented method for operating a rotary support system for an elevated device, the method comprising:
prompting, from a user, an input regarding a rotational orientation of a mast of the rotary support system relative to a base of the rotary support system;
responsive to the prompting the input, receiving the input from the user for the rotational orientation; and
responsive to the receiving the input, sending a signal to a controller that is coupled to at least one of the base and the mast.

B2. The method of paragraph B1, wherein the rotary support system is the rotary support system of any of paragraphs A1-A30.

B3. The method of any of paragraphs B1-B2, wherein the rotary support system includes at least one sensor module, and further wherein the at least one sensor module includes at least one of a wireless transceiver, an accelerometer, an anemometer, a barometer, an altimeter, a thermometer, an electronic compass, a global positioning system (GPS) receiver, and a bubble level.

B4. The method of paragraph B3, wherein the method further includes prompting the user to selectively activate an automated operation mode corresponding to one or more of the one or more sensor modules.

B5. The method of paragraph B4, wherein the method further includes, responsive to the user selectively activating the automated operation mode, sending a signal to the controller to enable or disable the automated operation mode.

B6. The method of any of paragraphs B3-B5, wherein the method further includes receiving a sensor signal from at least one sensor module.

B7. The method of paragraph B6, wherein the sensor signal includes sensor-supplied information pertaining to at least one of a set of location coordinates of the rotary support system, a rotational orientation of the mast relative to a compass direction, a tilt of the mast with respect to a horizontal plane, a wind speed measurement, a temperature measurement, a barometric pressure measurement, and a signal received by an antenna coupled to the mast.

B8. The method of any of paragraphs B1-B7, wherein the method further includes, responsive to the user selectively activating an/the automated operation mode and further responsive to receiving a sensor signal that indicates a wind speed greater than a predetermined threshold, sending a signal to a/the wireless receiver that includes a command to rotate the mast so as to reduce a force of wind on the rotary support system.

B9. The method of paragraph B7, wherein the method further comprises providing the user with a visual and/or audio indication of the sensor-supplied information.

B10. The method of any of paragraphs B1-B9, wherein the method is configured to be executed by a smart phone application.

C1. A remote electronic device, comprising:
a memory device including computer-executable instructions that, when executed, direct the remote electronic device to perform the method of any of paragraphs B1-B10;
a display configured to display indicia;
a transceiver for sending and receiving wireless signals; and
a user input mechanism configured to receive user inputs.

D1. A controller implemented method for operating a rotary support system for an elevated device, the method comprising:
receiving an input command, wherein the input command pertains to a rotational orientation of a mast relative to a base of the rotary support system; and
responsive to the receiving the input command, sending an output command to an electric motor that is configured to rotate the mast relative to the base.

D2. The method of paragraph D1, wherein the rotary support system is the rotary support system of any of paragraphs A1-A30.

D3. The method of any of paragraphs D1-D2, wherein the input command is a user-supplied input command that is transmitted from a remote electronic device.

D4. The method of paragraph D3, wherein the user-supplied input command includes a command to rotate the mast relative to the base through a user-specified angle of rotation.

D5. The method of any of paragraphs D3-D4, wherein the user-supplied input command includes a command to activate or deactivate an automated operation mode.

D6. The method of any of paragraphs D1-D5, wherein the rotary support system comprises at least one sensor module, and further wherein the input command is a sensor-supplied input command that is received from at least one sensor module.

D7. The method of paragraph D6, wherein the at least one sensor module includes one or more of a wireless transceiver, an accelerometer, an anemometer, a barometer, an altimeter, a thermometer, an electronic compass, a global positioning system (GPS) receiver, and a bubble level.

D8. The method of any of paragraphs D6-D7, wherein the output command includes a command to rotate the mast relative to the base responsive to the sensor-supplied input command.

D9. The method of any of paragraphs D1-D8, when dependent on paragraphs D5 and D6, wherein the sending the electronic signal to the electric motor responsive to the receiving the sensor-supplied input command is performed subsequent to the receiving the user-supplied input command to activate the automated operation mode.

D10. The method of any of paragraphs D8 or D9 when dependent on paragraph D8, wherein the output command includes a command to rotate the mast relative to the base so as to reduce a force of wind on the rotary support system when the anemometer measures a wind speed that is greater than a predetermined threshold wind speed.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more aspects of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities, should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

Controller 190 may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure.

Additionally or alternatively, one or more of controller 190 and remote electronic device 300 may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, when the disclosure or subsequently filed claims recite "a" or "a first" element or the equivalent thereof, such claims should be understood to include incorporation of one or more such elements, neither requiring nor excluding two or more such elements.

The invention claimed is:
1. A rotary support system for an elevated device, the system comprising:
 a base that includes a rotary mechanism; and
 a mast extending vertically from the base;
 wherein the mast is configured to support the elevated device at a vertically elevated position;
 wherein the mast is operatively coupled to the rotary mechanism;
 wherein the rotary mechanism is configured to selectively rotate the mast about a longitudinal axis of the mast responsive to a control input;
 wherein the mast has a cross-sectional profile, as measured in a plane perpendicular to the longitudinal axis of the mast, that is non-circular; and wherein the rotary mechanism includes a gear assembly for rotating the mast relative to the base, wherein the gear assembly includes a bearing assembly for facilitating a rotation of the mast with respect to the base about the longitudinal axis of the mast, and wherein the bearing assembly has an inner bore with a shape corresponding to the cross-sectional profile of the mast.

2. The rotary support system of claim 1, wherein the mast is configured to support the elevated device at a height of at least 6 feet vertically from a surface on which the base rests.

3. The rotary support system of claim 1, wherein the gear assembly includes a handle configured to be manually actuated by a user to rotate the mast relative to the base.

4. The rotary support system of claim 1, wherein the rotary mechanism includes an electric motor configured to drive the gear assembly to rotate the mast relative to the base.

5. The rotary support system of claim 4, wherein the electric motor is configured to be selectively coupled to and uncoupled from the gear assembly.

6. The rotary support system of claim 4, wherein the rotary support system further includes a remote electronic device and a controller configured to receive inputs from the remote electronic device and interface with the electric motor.

7. The rotary support system of claim 6, wherein the rotary support system further includes at least one sensor module operatively coupled to at least one of the base, the rotary mechanism, the mast, and the elevated device, and wherein the remote electronic device is configured to interface with at least one sensor module.

8. The rotary support system of claim 6, wherein the remote electronic device is configured to at least one of send commands to and receive information from at least one of:
 (i) at least one sensor module;
 (ii) the controller;
 (iii) the electric motor; and
 (iv) the elevated device.

9. The rotary support system of claim 1, wherein the rotary support system further includes at least one sensor module operatively coupled to at least one of the base, the rotary mechanism, the mast, and the elevated device.

10. The rotary support system of claim 9, wherein the at least one sensor module includes at least one of a wireless transceiver, an accelerometer, an anemometer, a barometer, an altimeter, a thermometer, an electronic compass, a global positioning system (GPS) receiver, and a bubble level.

11. The rotary support system of claim 1, wherein the elevated device includes a dipole antenna configured to be at least one of a receiving antenna and a transmitting antenna.

12. The rotary support system of claim 1, wherein the cross-sectional profile of the mast has one axis of symmetry.

13. A rotary support system for an elevated device, the system comprising:
 a base that includes a rotary mechanism;
 a mast operatively coupled to the rotary mechanism and extending vertically from the base;
 an electric motor configured to rotate the mast relative to the base;
 at least one sensor module operatively coupled to at least one of the base, the rotary mechanism, the mast, and the elevated device; and
 a controller configured to interface with the electric motor;
 wherein the controller is configured to receive a sensor input from the at least one sensor module and to direct the electric motor to rotate the mast about a longitudinal axis of the mast responsive to the sensor input;
 wherein the mast has a cross-sectional profile, as measured in a plane perpendicular to the longitudinal axis of the mast, that is non-circular; and
 wherein the rotary mechanism includes a gear assembly for rotating the mast relative to the base, wherein the gear assembly includes a bearing assembly for facilitating a rotation of the mast with respect to the base about the longitudinal axis of the mast, and wherein the bearing assembly has an inner bore with a shape corresponding to the cross-sectional profile of the mast.

14. The rotary support system of claim 13, wherein the at least one sensor module includes at least one of a wireless transceiver, an accelerometer, an anemometer, a barometer, an altimeter, a thermometer, an electronic compass, a global positioning system (GPS) receiver, and a bubble level.

15. The rotary support system of claim 13, wherein the rotary support system further includes a remote electronic device configured to communicate with at least one of the at least one sensor module, the controller, and the elevated device.

16. The rotary support system of claim 15, wherein the remote electronic device is configured to transmit a command to the controller to rotate the mast to a particular rotational orientation.

17. The rotary support system of claim 13, wherein the controller is configured to rotate the mast without user intervention.

* * * * *